United States Patent
Mouille (10) Patent No.: US 12,392,866 B2
(45) Date of Patent: Aug. 19, 2025

(54) HYBRID RADAR JAMMING AND COMMUNICATION APPARATUS

(71) Applicant: BAE SYSTEMS Information and Electronic Systems Integration Inc., Nashua, NH (US)

(72) Inventor: David A. Mouille, Bethlehem, PA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 331 days.

(21) Appl. No.: 18/317,618

(22) Filed: May 15, 2023

(65) Prior Publication Data
US 2024/0369680 A1    Nov. 7, 2024

Related U.S. Application Data (63) Continuation-in-part of application No. 17/752,925, filed on May 25, 2022.

(51) Int. Cl.
| | |
|---|---|
| *G01S 7/38* | (2006.01) |
| *G01S 7/02* | (2006.01) |
| *H04K 3/00* | (2006.01) |

(52) U.S. Cl.
CPC ............ *G01S 7/38* (2013.01); *G01S 7/021* (2013.01); *H04K 3/45* (2013.01); *H04K 3/46* (2013.01);
(Continued)

(58) Field of Classification Search
CPC .................................. H04K 3/224; G01S 7/38
(Continued)

(56) References Cited

U.S. PATENT DOCUMENTS

| | | | |
|---|---|---|---|
| 4,990,920 A * | 2/1991 | Sanders, Jr. ............ | G01S 7/38 342/14 |
| 11,394,503 B2 | 7/2022 | Kimura | |

(Continued)

OTHER PUBLICATIONS

Moo, Peter et al., Multifunction RF Systems for Naval Platforms, Jun. 28, 2018, Sensors, pp. 1-37 (Year: 2018) (Year: 2018).*
(Continued)

*Primary Examiner* — Vladimir Magloire
*Assistant Examiner* — Eric K Hodac
(74) *Attorney, Agent, or Firm* — Maine Cernota & Curran (57) ABSTRACT

A hybrid electronic warfare and communications system (EW/COMM) eliminates the space, power, weight, and cost of a dedicated communication system by exchanging messages with other nodes in a network as phase modulations of radar jamming signals. Some embodiments impose message phase modulations onto CW jamming signals, while other embodiments interleave message phase modulations with pseudorandom phase modulations of the jamming signals. Message chip rates can be matched to pseudorandom phase modulation chip rates. Messages are thereby obfuscated as either phase noise or random phase modulation of the jamming signals. Messages can be encoded as BPSK or QPSK modulations. Messages can be preceded by pre-established headers known to other nodes, and distinguished thereby from random noise modulations. Some embodiments include a dedicated COMMS module and/or antenna, while other embodiments implement the communications function mostly or entirely in software. Messages can be encrypted before transmission and decrypted after reception.

20 Claims, 8 Drawing Sheets

(52) U.S. Cl.
CPC ..... *H04K 2203/22* (2013.01); *H04K 2203/32* (2013.01)

(58) Field of Classification Search
USPC .......................................................... 342/19
See application file for complete search history.

(56) References Cited

U.S. PATENT DOCUMENTS

| | | |
|---|---|---|
| 2010/0283656 A1 | 11/2010 | Zavrel, Jr. |
| 2017/0356988 A1 | 12/2017 | McKerracher |
| 2020/0084759 A1 | 3/2020 | Liu et al. |
| 2022/0019795 A1 | 1/2022 | Aune et al. |
| 2022/0126961 A1 | 4/2022 | Bergsrud |
| 2023/0059120 A1 | 2/2023 | Ham |
| 2023/0111392 A1 | 4/2023 | Noguchi |
| 2023/0358853 A1 | 11/2023 | Kumari et al. |
| 2024/0116605 A1 | 4/2024 | Gajjar et al. |
| 2024/0145912 A1 | 5/2024 | Brillant |

OTHER PUBLICATIONS

Final Office Action for U.S. Appl. No. 17/752,925 mail date Apr. 4, 2025, 29 pages.
Office Action for U.S. Appl. No. 17/752,925 mail date Jun. 6, 2024, 25 pages.
Moo, Peter et al., Multifunction RF Systems for Naval Platforms, Jun. 28, 2018, Sensors, pp. 1-37 (Year: 2018).

\* cited by examiner

HYBRID RADAR JAMMING AND COMMUNICATION APPARATUS

RELATED APPLICATIONS

This application is a continuation in part of U.S. application Ser. No. 17/752,925, filed May 25, 2022, which is herein incorporated by reference in its entirety for all purposes.

FIELD

The disclosure relates to wireless communication, and more particularly, to vehicles that require both radar and wireless communication.

BACKGROUND

Nearly all military ground vehicles, and military aircraft, are equipped with wireless communication systems (COMMS). Often, the success of combat operations requires a COMMS system on a military vehicle to provide secure and reliable communication between friendly forces. Accordingly, many military vehicles are equipped with secure, robust communication apparatus, such as LINK-16 apparatus. Typically, specific frequency bands are assigned for such communication, with each apparatus selecting an appropriate combination of RF channels within the designated bands.

Electronic warfare (EW) has also become a nearly essential aspect of modern warfare. As a result, EW apparatus is implemented on many types of military aircraft, both manned and unmanned, as well as military ground vehicles and naval ships. EW can include both detecting and disrupting hostile radar, hostile communications, and other hostile wireless transmissions. Disrupting hostile radar, in particular, can be mission critical, and can require immediate, effective, and persistent implementation so as to prevent hostile missiles and other hostile weapons from "locking" onto and threatening friendly assets.

There are at least two EW approaches that can be implemented to disrupt a hostile radar. One is a "deception" approach, essentially a "finesse" approach, wherein signals are transmitted that resemble the reflected signals that would be received by the radar, but have different timing and/or other characteristics that mislead the radar into reporting targets at erroneous distances, sizes, directions, velocities, etc. This approach can be highly effective and requires only modest output energies. However, radar deception requires accurate identification of the type of radar that is to be counteracted and its operating characteristics.

The other approach to EW disruption is the "jamming" approach, essentially a "brute force" approach that seeks to blind a radar by directing a signal toward the radar that is much stronger than any reflected signals. This approach has the advantage of relative simplicity, and does not require a detailed understanding of the operating characteristics of the radar, beyond the operating frequency of the radar, which can be readily detected. In some cases, the jamming signal is a continuous wave (CW), unmodulated transmission that concentrates all of the jamming power at the operating frequency of the radar. In other cases, the jamming signal is phase modulated in a pseudorandom manner ("noise modulated radar"), thereby distributing the jamming power over a band of frequencies, so that a "frequency agile" radar cannot simply avoid the jamming by switching to a different operating frequency. The bandwidth over which the jamming energy is distributed is determined, in part, by the "chip rate" of the phase modulations, i.e. the rate at which the phase is modulated.

In some military applications, such as combat drones, the requirement for both secure wireless communications and EW capability can substantially increase the cost while limiting the volume, weight and power that is available for other types of apparatus, such as cameras, weapons, and such like.

Furthermore, even though military communications typically employ sophisticated encryption, in many cases hostile forces are nevertheless able to glean valuable information from intercepted friendly communications, for example by inferring that an attack is immanent due to a sudden increase in the volume of communications that are being transmitted. Accordingly, it is sometimes desirable to render wireless communications in combat environments as difficult as possible to detect.

When a plurality of aircraft or other military assets are operating as a group within an area, it can often be desirable for them to share information, for example to enable triangulation of the location of hostile radar by comparing detections made at different locations by the EW systems of the various assets. However, because this information must be routed from the EW systems through the communication systems, there is an inevitable time lag before information detected by one of the EWs can reach the other EWs in the group. This inter-EW communication time lag can degrade the accuracy of the triangulations and other derived information.

What is needed, therefore, is an apparatus that can provide both electronic warfare (EW) and wireless communication for a vehicle, while reducing the cost, size, weight, and power requirements of the apparatus, reducing the time lag required for communicating information detected by the EW apparatus, and rendering communications difficult or impossible to detect.

SUMMARY

The present disclosure is an apparatus that can provide both electronic warfare (EW) and wireless communication for a vehicle, while reducing the cost, size, weight, and power requirements of the apparatus, reducing the time lag required for communicating information detected by the EW apparatus, and rendering communications difficult, and in some embodiments nearly impossible, to detect.

In co-pending U.S. patent application Ser. No. 17/752,925, filed May 25, 2022, also by the present applicant, a hybrid RADAR and communication system is disclosed that provides both RADAR and a wireless communication module (COMMS) sharing the same antenna, transmit and receive amplifiers, and other hardware, thereby reducing size, weight, and power requirements. The disclosed hybrid system facilitates communication in hostile environments by enabling data exchange at any frequency within a broad EW frequency range. Simultaneous communication and RADAR jamming are enabled in embodiments by transmitting simultaneously at two different frequencies (similar to "Frequency-Dependent Multiple Access" communication—FDMA), or by alternating messages with EW waveforms at the same RF frequency (similar to "Time-Dependent Multiple Access" communication—TDMA). While these approaches are highly effective in enabling communication in hostile environments, the possibility remains that communications that are transmitted between RADAR jamming pulses, or transmitted simultaneously with jamming pulses but at a different frequency, may be detected by hostile forces.

The present disclosure is a hybrid electronic warfare and communications (EW/COMMS) system that adds a communication function to a CW and/or phase noise modulated radar jamming system by encoding messages as phase modulations of the jamming signal. This approach is somewhat analogous to Code Dependent Multiple Access (CDMA) communication, in that the communications occur at the same time and at the same frequency as the RADAR jamming, and are nearly indistinguishable from random phase modulation unless the encoding pattern of the message is known to the receiver. The added cost, size, weight, and power requirements of a separate, dedicated communication system are thereby eliminated, while the communications are obfuscated by making them appear to be jamming signals, thereby rendering them difficult or impossible to detect and intercept.

According to embodiments of the present disclosure, a CW and/or phase noise modulated radar jamming system is adapted to function as a combined EW and communication (EW/COMM) system. In embodiments, each message comprises a series of symbols that are encoded as "phase shift keying" (PSK) onto the radar jamming signal, for example by imposing 0/180 degree phase shifts (binary phase shift keying, BPSK) or 0\90\180\270 degree phase shifts (quad phase shift keying, QPSK) onto the jamming signal. These phase shifts can be applied to an otherwise phase continuous wave (CW) jamming signal, or in lieu of pseudorandom phase shifts that would otherwise be imposed on the jamming signal as phase noise modulation. In either case, hostile entities will likely interpret these phase shifts simply as additional phase noise or as intentional pseudorandom noise-modulation of the jamming signal. Furthermore, because the messages are transmitted at the same frequency and power level, and by the same antennae, as the CW or pseudorandom phase modulated jamming signal, the message transmission functions as a radar jamming signal at the same time that it communicates messages to other nodes in the network.

In embodiments, each message, or each segment of a message, begins with a specific "header" comprising a series of symbols that can be recognized by a receiving node, thereby enabling the receiving node to detect and extract the message from the jamming signal without any need for pre-establishing a dedicated communication channel via control signaling. Of course, the communication module (COMMS) is also able to monitor radar jamming signals transmitted by other compatible nodes, detect any transmitted headers encoded as phase shifts onto the jamming signals, and extract the associated messages. In various embodiments, the added COMMS software can also encrypt and decrypt messages.

In some embodiments where pseudorandom phase modulations are imposed on the radar jamming signal during gaps between message transmissions, the "chip transmission rate" of the messages is adjusted to match the chip transmission rate of the pseudorandom noise. In other words, the rate at which the radar jamming phase is changed is the same both during pseudorandom phase modulation and during message transmission. The messages are thereby highly obfuscated, in that it can be nearly impossible to recognize that messages are being interleaved with pseudorandom noise modulations, unless the encoding patterns of the message headers are known.

Some embodiments comprise dedicated COMMS hardware, in addition to what would be required by a similar, dedicated jamming system, such as a physically distinct communication module (COMMS), and/or one or more additional antennae to provide required directional or omnidirectional transmission and reception of radar jamming signals. In other embodiments, the communication functionality is implemented mainly or entirely by augmenting the software of an EW control module in an existing CW and/or noise modulated EW jamming system, without any significant hardware changes or additions.

Because the present disclosure enables direct communication between EW systems, without any requirement to pre-establish dedicated communication channels and/or route the communication through separate COMMS apparatus, the "lag" that is associated with inter-EW communication is greatly reduced as compared to traditional communication via e.g. Link 16. As a result, triangulations and other collaborative intelligence that results from inter-EW communications is greatly improved.

One general aspect of the present disclosure is a hybrid radar jamming system and message communication system, the system being operable as a node in a communication network. The system includes an RF receiving system configured to receive RF energy transmitted from a hostile radar, an EW control module configured to determine an operating frequency of the hostile radar according to the received RF energy, and to output a responsive jamming phase control signal, a communications module configured to encode a first message as a series of symbols representative of a series of message RF phase shifts, and to output the series of message rf phase shifts at a communication chip rate as a message phase control signal, a selector configured to select, as a carrier wave phase control signal, either the jamming phase control signal or the message phase control signal, a carrier wave modulator configured to impose phase modulations onto a jamming RF carrier wave according to the carrier wave phase control signal, and an RF transmitting system configured to transmit RF energy according to the jamming RF carrier wave that is operable as a hostile radar jamming signal.

In embodiments, the transmitted RF energy being further operable as a message communication signal having the first message encoded therein when the selector selects the message phase control signal, said message communication signal being detectable by at least one other node in the communication network, and the communications module is further configured to detect and extract a second message encoded in a jamming rf carrier wave transmitted by another node within the communication network.

In any of the above embodiments, the first message can include a header that is recognizable to other nodes in the network, the header being selected from among a group containing at least one pre-established header, and detecting the second message can include recognizing that the second message is preceded by one of the pre-established headers.

In any of the above embodiments, the EW control module can be able to output a series of pseudorandom jamming RF phase shifts at a jamming chip rate as the jamming phase control signal. In some of these embodiments, when the jamming phase control signal is a series of pseudorandom jamming RF phase shifts, the communication chip rate is equal to the jamming chip rate.

In any of the above embodiments, the communications module can be further able to encrypt the first message before it is encoded as a series of symbols, and to decrypt the second message.

In any of the above embodiments, the system can include a plurality of antennae. In some of these embodiments, the plurality of antennae are optimized for directing the transmitted RF energy toward the hostile radar, while also ensuring that other nodes in the communication network are able to detect the transmitted RF energy. In any of these embodiments, at least one of the antennae can be a directional antenna. In any of these embodiments, at least one of the antennae can be a flat panel element array.

In any of the above embodiments, the communications module can be configured to generate and to receive at least one of binary phase shift encoded and quadrature phase shift encoded communication signals.

A second general aspect of the present disclosure is a computer program product that includes one or more non-transitory machine-readable mediums having instructions encoded thereon that, when executed by one or more processors, are configured to cause the system of the first general aspect to transmit and receive messages while also concurrently jamming a hostile radar by executing the steps of causing the RF receiving system to receive RF energy transmitted from the hostile radar, causing the EW control module to determine an operating frequency of the hostile radar according to the received RF energy, and to output a responsive jamming phase control signal, causing the communications module to encode a first message as a series of symbols representative of a series of message RF phase shifts, and to output the series of message rf phase shifts at a communication chip rate as a message phase control signal, causing the selector to select, as a carrier wave phase control signal, either the jamming phase control signal or the message phase control signal, causing the carrier wave modulator to impose phase modulations onto a jamming RF carrier wave according to the carrier wave phase control signal, causing the RF transmitting system to transmit RF energy according to the jamming RF carrier wave that is operable as a hostile radar jamming signal, the transmitted RF energy being further operable as a message communication signal having the first message encoded therein when the selector selects the message phase control signal, said message communication signal being detectable by at least one other node in the communication network, and causing the communications module to detect and extract a second message encoded in a jamming rf carrier wave transmitted by another node within the communication network.

In embodiments, the instructions, when executed by the system, are further configured to cause the communication module to include at a beginning of the first message a header that is recognizable to other nodes in the network, the header being selected from among a group of at least one pre-established header, and to cause the communication module when detecting the second message to recognize that the second message is preceded by one of the pre-established headers.

In any of the above embodiments, the instructions, when executed by the system, can be further configured to cause the EW control module to output a series of pseudorandom jamming RF phase shifts at a jamming chip rate as the jamming phase control signal. In some of these embodiments, the instructions, when executed by the system, are configured, when the jamming phase control signal is a series of pseudorandom jamming RF phase shifts, to cause the communication chip rate to be equal to the jamming chip rate.

In any of the above embodiments, the instructions, when executed by the system, can be further configured to cause the communications module to encrypt the first message before it is encoded as a series of symbols, and to decrypt the second message.

In any of the above embodiments, the system can include a plurality of antennae. In some of these embodiments, the plurality of antennae are optimized for directing the transmitted RF energy toward the hostile radar, while also ensuring that other nodes in the communication network are able to detect the transmitted RF energy. In any of these embodiments, at least one of the antennae can be a directional antenna. And in any of these embodiments, at least one of the antennae can be flat panel element array.

And in any of the above embodiments, the instructions, when executed by the system, can be configured to cause the communications module to generate and to receive at least one of binary phase shift encoded and quadrature phase shift encoded communication signals.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present disclosure is an apparatus that can provide both electronic warfare (EW) and wireless communication for a vehicle, while reducing the cost, size, weight, and power requirements of the apparatus, reducing the time lag required for communicating information detected by the EW apparatus, and rendering communications difficult, and in some embodiments nearly impossible, to detect.

More specifically, the present disclosure is a hybrid EW/COMM system that adds a communication function to a CW and/or noise modulated radar jamming system by encoding messages as phase modulations of the jamming signal. The added cost, size, weight, and power requirements of a separate, dedicated communication system are thereby eliminated, while the communications are obfuscated by the jamming signal and rendered difficult or impossible to detect and intercept. By establishing direct communication between EW systems, the time lag associated with inter-EW communications is also greatly reduced.

Figure 1:
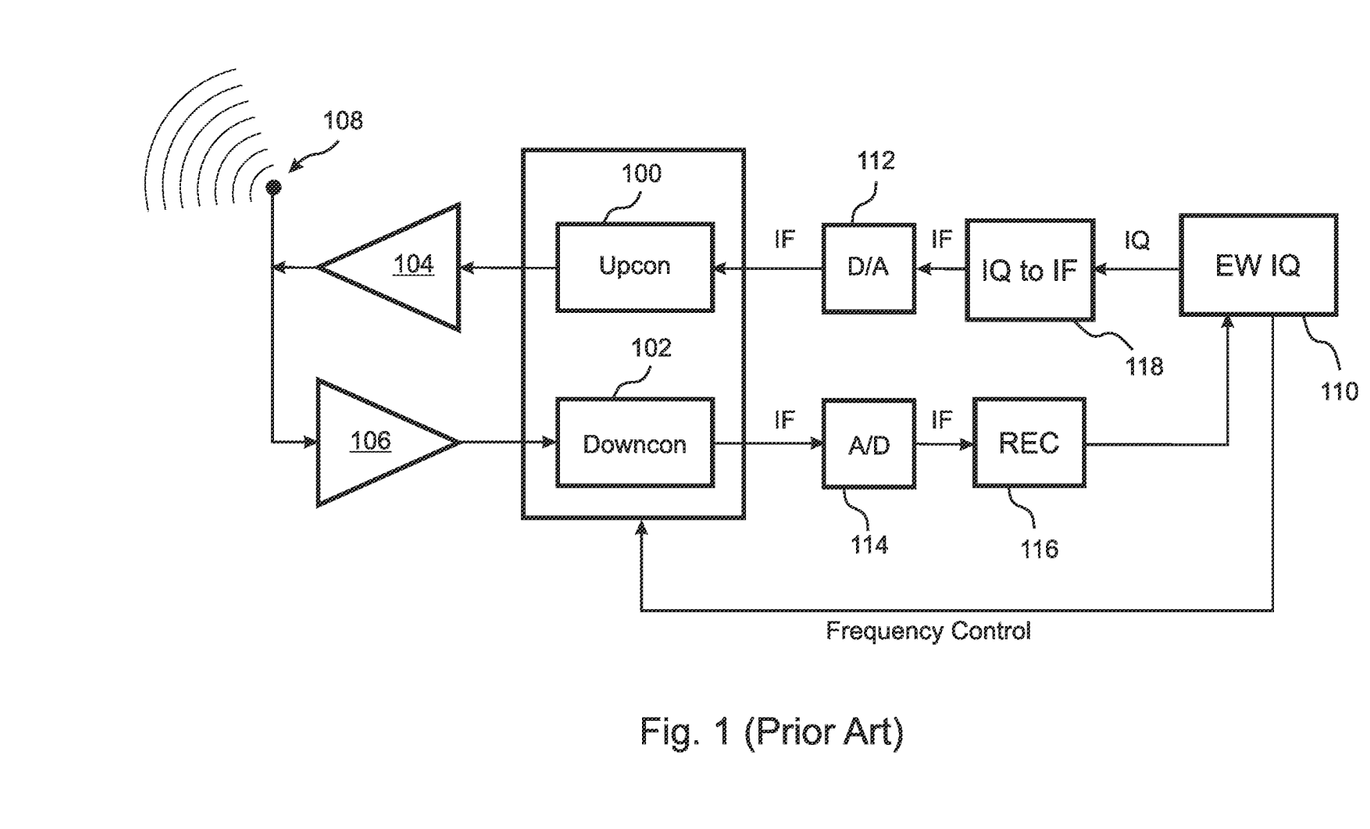
FIG. 1 is a block diagram that illustrates the components of a typical CW and/or noise modulated radar jamming system of the prior art.

With reference to FIG. 1, most radar jamming systems include one or more antennae 108, an RF transmitting amplifier 104, and an RF receiving amplifier 106. In addition, a radar jamming system includes a frequency upconverter 100 and a frequency downconverter 102 that are able to convert any received waveform into a received EW waveform at an EW "intermediate frequency" (IF frequency), and are also able to convert an EW waveform from the IF frequency to a desired transmission frequency. An A/D converter 114 and a D/A converter 112 are used to interconvert the IF waveforms between analog and digital formats. The antennae 108, RF transmitting amplifier 104, frequency upconverter 100, and D/A 112 function together as an "RF transmitting system," while the antennae 108, RF receiving amplifier 106, downconverter 102, A/D 114, and an RF receiver 116 function together as an "RF receiving system." The same antenna or antennae 108 may be used by both the RF transmitting system and the RF receiving system, or the radar jamming apparatus may include one or more antennae that are dedicated exclusively to either transmitting and/or receiving RF signals.

In one embodiment the RF transmitting system and/or the RF receiving system can include filters and amplifiers for the processing of the signals. In addition, the up-conversion and down-conversion to and from the IF frequency can be accomplished by one or more mixers.

In one embodiment the location and other properties of the hostile target may be known or have some level of information that is a priori information or obtained/updated by other communication protocols. In other embodiments the hostile target is an unknown target. In one example the RF receiver system obtains signals from the antenna 108 and the incoming RF signal is amplified and/or filtered by an RF front end. The RF signal is then down-converted to the IF frequency and then digitized by the A/D converter 114.

Typically, the output of the RF receiving system in a radar jamming apparatus will be directed to an EW control module (EW IQ) 110 that is responsible for identifying the signal as a hostile radar signal, estimating the location of the hostile radar, and determining the operating frequency of the hostile radar.

The output of the EW control module 110 is a jamming phase control signal that is either a constant voltage, if CW jamming is to be applied, or a series of phase control pulses, referred to herein as an "IQ series." The jamming phase control signal is directed to carrier wave modulator, referred to herein as an "IQ to IF converter" 118, which generates a digital representation of an RF carrier wave at the intermediate frequency (IF), and applies phase shifts to the RF carrier wave as directed by the jamming phase control signal. The digital RF carrier wave at the IF frequency is converted to an analog IF wave by a digital to analog converter (D/A) 112, and is then further converted to the operating frequency of the hostile radar by the upconverter 100, as directed by the EW control module 110. The jamming signal is then amplified by an amplifier 104 and transmitted by the one or more antennae 108.

Embodiments of the present disclosure provide a hybrid EW and communication (EW/COMM) system that performs the EW functions of a conventional CW and/or noise modulated radar jamming system, such as FIG. 1, while also making use of the jamming hardware to transmit and receive communication signals by encoding messages as phase modulations of the jamming signal. The messages can be a wide array of information related to the hostile targets such as location, frequency of interest, hostile assets and other hostile target data. The messages can also communicate information about the friendly assets such as location of other nodes, friendly assets, and other friendly mission related information.

Figure 2A:
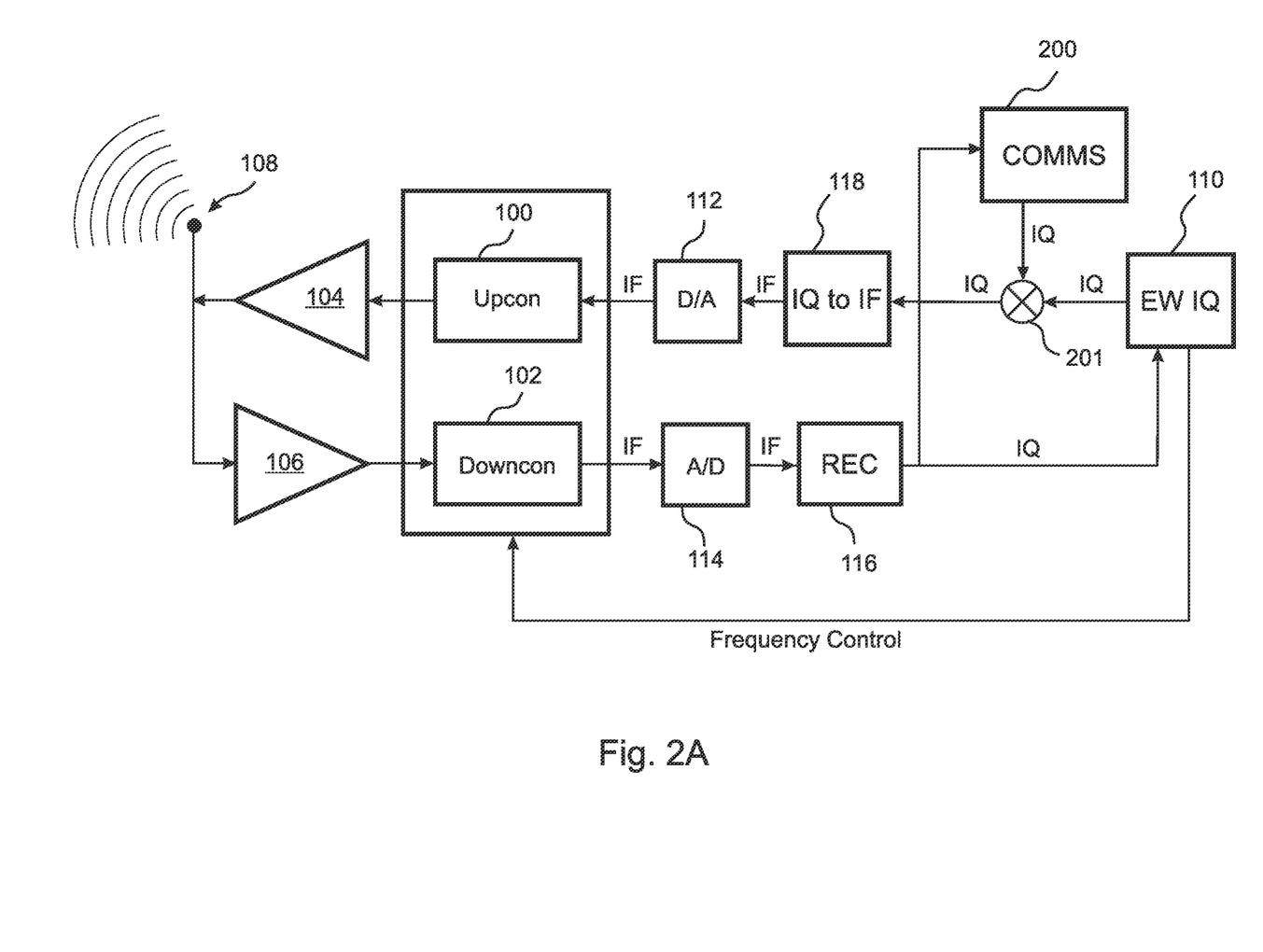
FIG. 2A is a block diagram that illustrates components of the disclosed EW/COMM apparatus in an embodiment of the present disclosure that includes a physically distinct COMMS control module.

With reference to FIG. 2A, in addition to the elements illustrated in FIG. 1, the disclosed EW/COMM system includes a communications module (COMMS) 200 that is able to convert outgoing messages into symbols, and to encode the symbols into a pattern of phase shifts, for example by phase shift keying (PSK) such as binary phase shift keying (BPSK) or quad-phase shift keying (QPSK). In embodiments, each message, or each segment of a message, begins with a specific "header" comprising a series of pre-arranged symbols that can be recognized by a receiving node, thereby enabling the receiving node to recognize and extract the message from the jamming signal without any need for pre-establishing a dedicated communication channel via control signaling. In embodiments, the COMMS 200 is also able to encrypt and decrypt the messages.

In one embodiment the header information is a priori information available to the transmitter and the appropriate nodes in the network. It can be pre-established and stored in memory or previously communicated via secure channels to the appropriate nodes in the communications network. In one example there is more than a single header that can be used to communicate with different nodes. Without knowledge of the structure of the headers, the transmitted messages are thereby rendered highly difficult to detect, because they appear simply to be part of the pseudorandom phase modulation. Or, if the jamming signal is otherwise a pure CW sine wave, the message phase modulations, as detected by a hostile entity, appears similar to background noise, and likely go unnoticed. Furthermore, because the messages are transmitted at the same frequency and power level, and by the same antennae, as the jamming signal, the message transmissions jam the hostile radar at the same time that they communicate messages to other nodes in the network. Accordingly, message transmission does not interrupt the jamming of the hostile radar.

The output of the COMMS 200 is an IQ series of phase control pulses, referred to herein as the communication phase control signal. The communication phase control signal is directed to a "selector" 201 at a pulse rate that is referred to herein as the "chip rate" of the communication phase control signal. The jamming phase control signal from the EW IQ 110 is also directed to the selector 201, which selects either the output of the COMMS 200 or the output of the EW IQ 110, and directs the selected output to the "IQ to IF converter" 118, which generates a digital representation of an RF carrier wave at the IF frequency, and applies phase shifts to the RF carrier wave as directed by the phase control input received from the selector 201.

As is well known, BPSK encodes symbols as phase shifts of an RF carrier between zero degrees and 180 degrees.

These can be output by a COMMS 200 as a single physical or logical "bit," which can be conceptually represented as a single electronic output that toggles between zero volts and some other voltage, or between two voltages of equal amplitude and opposite polarity. Similarly, QPSK encoded symbols as phase shifts of an RF carrier between zero degrees, 90 degrees, 180 degrees, and 270 degrees, and can be output by a COMMS 200 as two physical or logical "bits," which can be conceptually represented as two physical outputs, each of which toggles between zero volts and some other voltage, or between two voltages of equal amplitude and opposite polarity. Extension to PSK encoding as phase shifts among eight or sixteen phases, using three or four electronic output "bits," will be clear to one of ordinary skill in the art.

As in FIG. 1, the digital representation of an RF carrier wave that is output by the IQ to IF converter 118 is directed to a digital to the D/A 112, which produces an analog RF output at the IF frequency and with the implemented phase shifts. Generating the digital carrier wave at an intermediate frequency enables the carrier wave to always have the same frequency, regardless of the frequency of the radar system that is being jammed. The IF frequency can be chosen such that a D/A 112 having an acceptable dynamic range and cost can be implemented.

From the D/A 112, the analog, phase-shifted IF signal is directed to the "upconverter" 100, and then amplified 104 and transmitted using at least one antenna 108.

Receiving of RF energy, and monitoring for the presence and characteristics of hostile radar systems by the EW IQ 110 functions in essentially the manner previously described with reference to FIG. 1. At the same time, the output of the receiver 116 is also directed to the COMMS 200, which monitors the received energy to detect the presence of messages, for example by monitoring for the occurrence of a pre-determined phase-encoded message header. The detection of messages from other nodes can be via the same antenna elements as the receiving of hostile radar signals, or via a distinct antenna or antenna elements, such as a planar array antenna having a multitude of antenna elements. In embodiments, the same antennae 108 are used to transmit both radar jamming and messages, thereby obfuscating the messages. In some embodiments, additional, directional antennae and/or directional transmitting arrays can be used to enhance the transmission of messages to other nodes, where the additional transmitted message energy is unlikely to be detected by hostile entities.

Figure 2B:
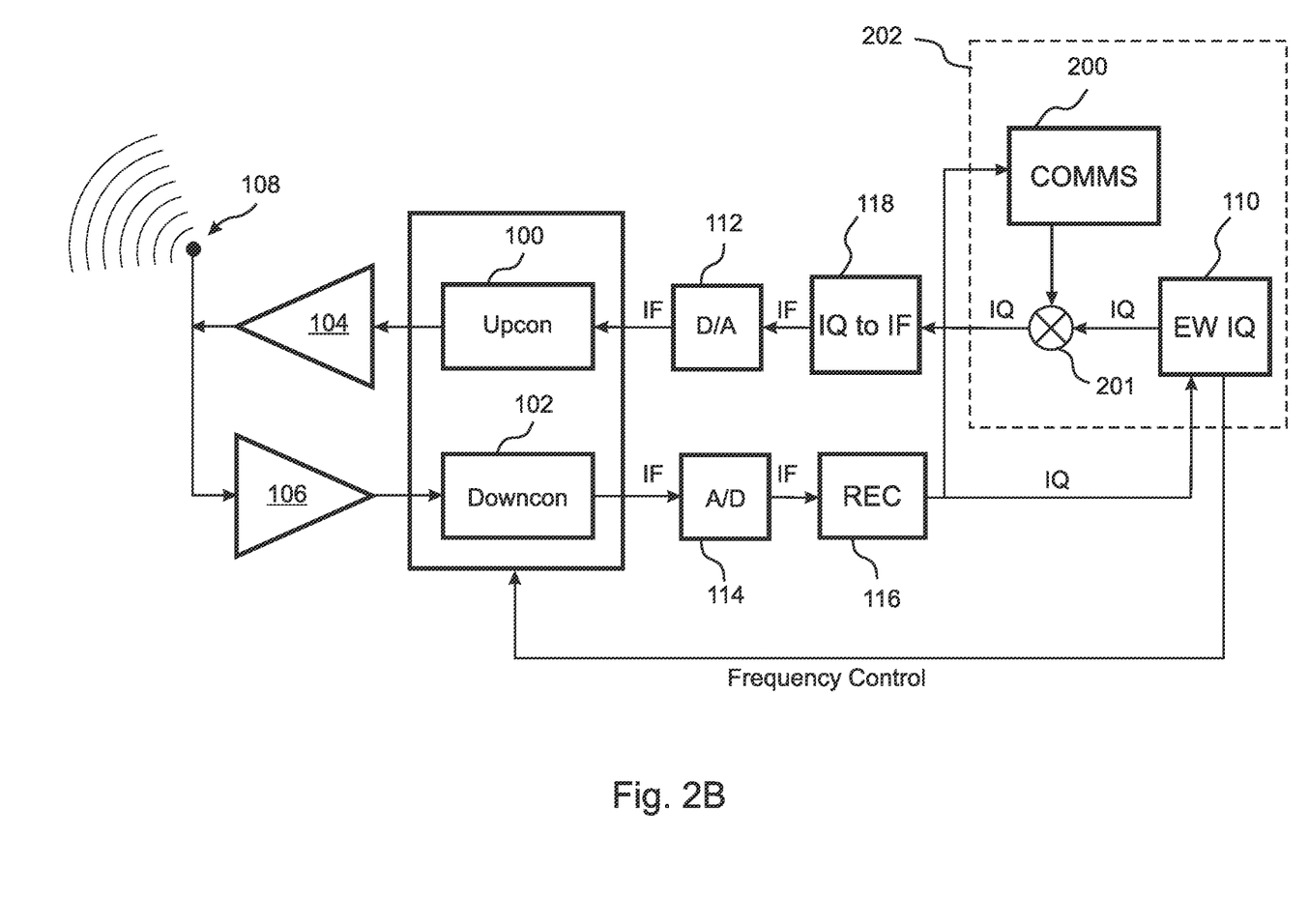
FIG. 2B is a block diagram that illustrates components of the disclosed EW/COMM apparatus in an embodiment similar to FIG. 2A, but wherein the COMMS module is implemented as additional software included in the EW control module.

In FIG. 2A, the "COMMS" module 200 and selector 201 are illustrated as physically separate modules that are distinct from the EW IQ module 110. However, with reference to FIG. 2B, in some embodiments the COMMS functionality 200 and selector functionality 201 are implemented by adding additional instruction coding to the EW control module (EW IQ) 110, with few if any hardware changes or additions being required, and without need for a physically distinct COMMS module 200 or phase modulator 201. In these embodiments, the EW control module 110, the selector 201, and the COMMS module 200 are all physically combined together as a hybrid EW/COMMS controller 202.

Because the disclosed EW/COMM hybrid system provides direct communication between EW systems, without requiring pre-establishment of dedicated communication channels, the "lag" that is associated with inter-EW communication is greatly reduced, as compared to traditional communication via e.g. Link 16, so that the triangulations and other collaborative intelligence that results from inter-EW communications is greatly improved.

Figure 3A:
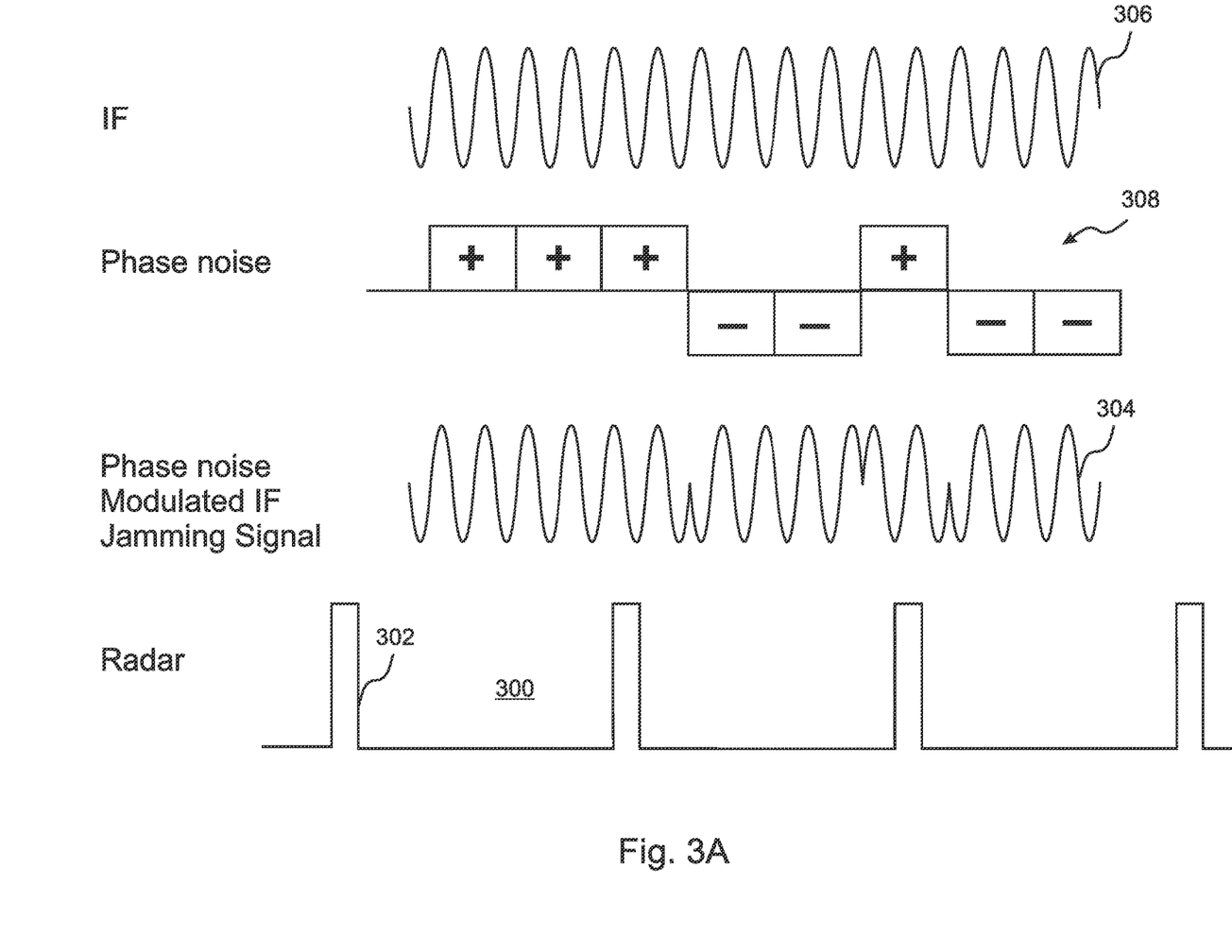
FIG. 3A illustrates the operation of a pulsed radar apparatus, and further illustrates the encoding of a message by phase modulation of a CW jamming signal.

With reference to FIG. 3A, it is notable that modern radar systems typically operate in a pulsed mode 300, whereby the radar emits RF as a discrete series of pulses 302, with the reflected RF energy (not shown) being detected in between the pulses 302. In embodiments, when a phase noise modulated jamming IQ stream 308 from the EW IQ 110 is selected by the selector 201, it is combined with the digital representation of the IF 306 to provide a phase noise modulated IF jamming signal 304.

Figure 3B:
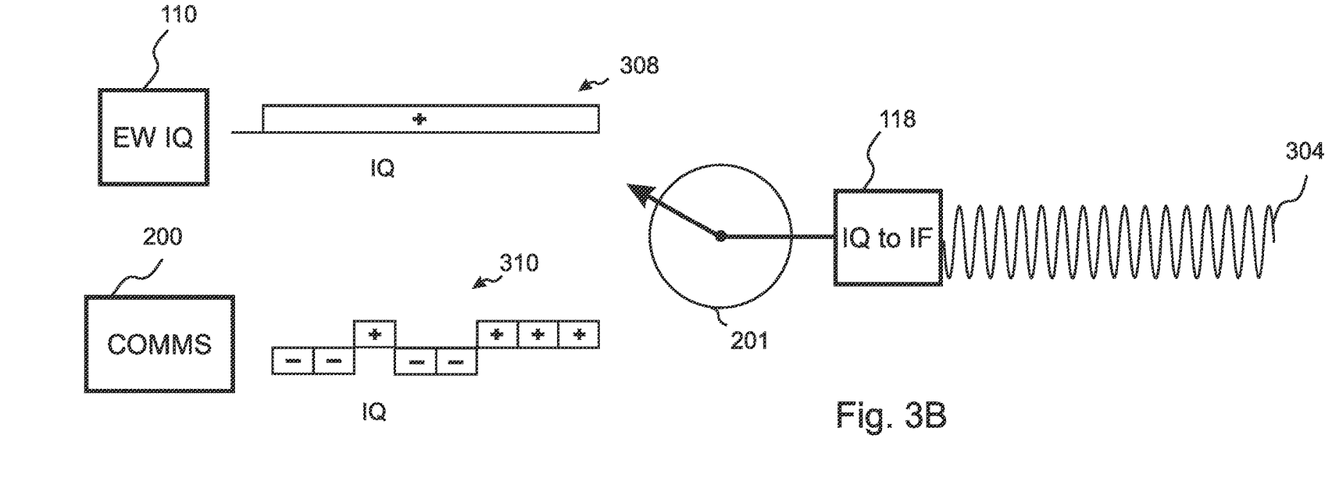
FIG. 3B illustrates a selector selecting a CW jamming phase control signal from the EW IQ.
Figure 3C:
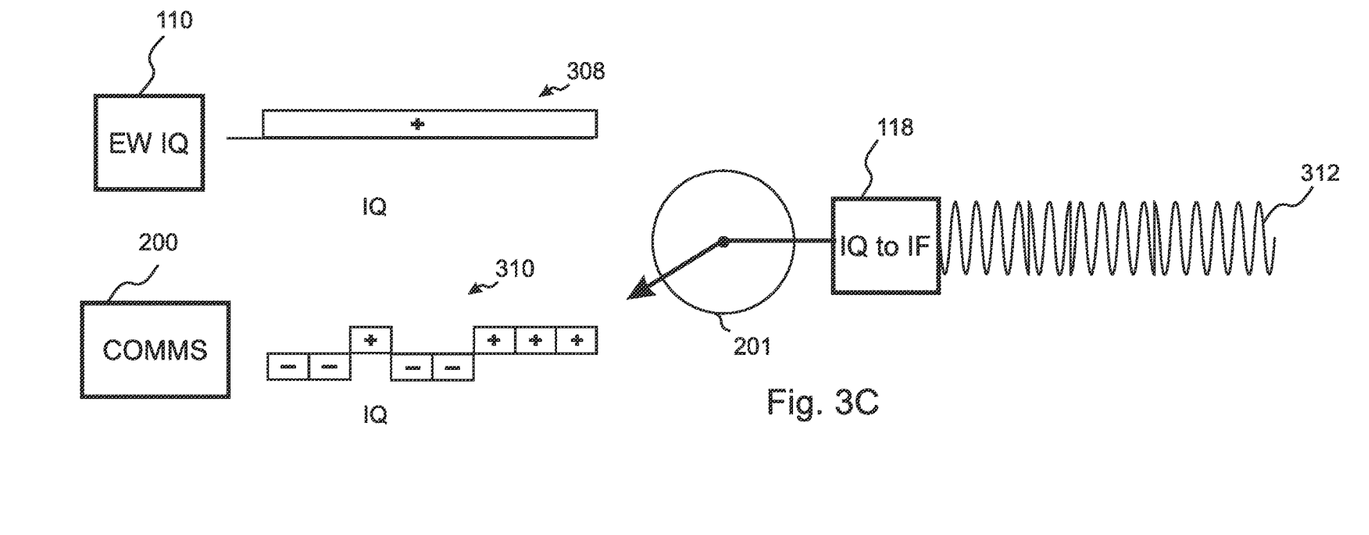
FIG. 3C illustrates the selector selecting a message phase control signal from the COMMS in the embodiment of FIG. 3B.

With reference to FIGS. 3B and 3C, if the IF jamming signal 304 is a continuous wave (CW) signal, then the phase controlling output 308 of the EW IQ 110 will not vary with time, while the IQ stream 310 of the COMMS 200 will vary at whatever chip rate is optimal for message communication. In FIG. 3B, the selector 201 has selected the output 308 of the EW IQ 110, and so there is no phase modulation of the IF jamming signal 304. In FIG. 3C, the selector 201 has selected the output of the COMMS 200, and so the output of the IQ to IF converter 312 is phase modulated according to the message that has been phase encoded, for example as BPSK or QPSK. In such cases, hostile entities will likely interpret the phase shifts of FIG. 3C simply as additional, naturally occurring phase noise or as intentional pseudorandom noise-modulation of the jamming signal 304.

Figure 3D:
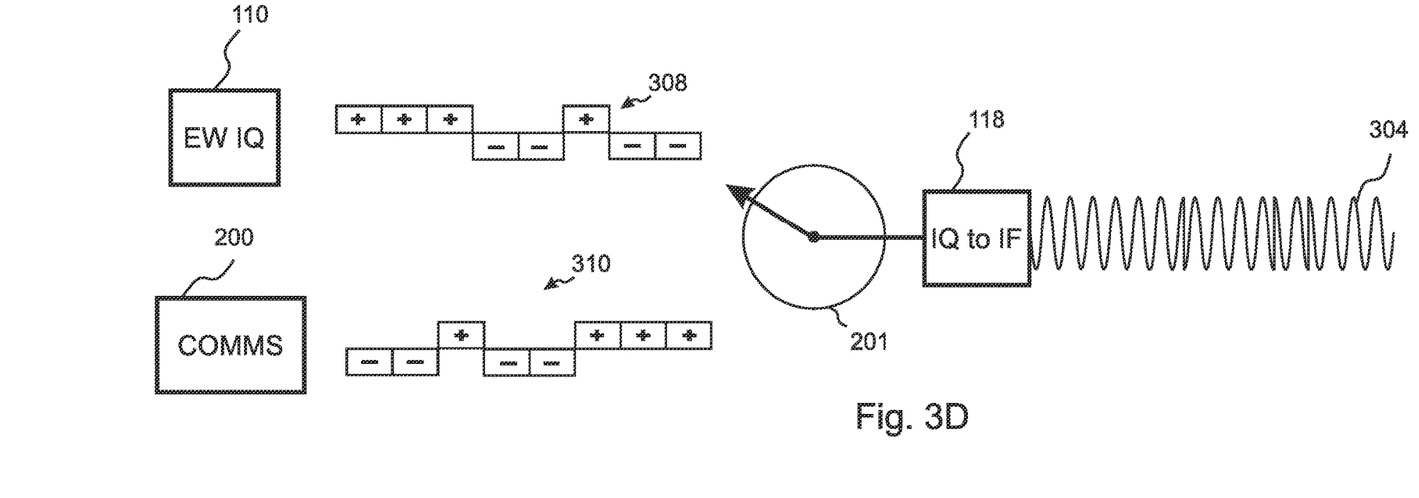
FIG. 3D illustrates a selector selecting a pseudorandom phase noise modulated jamming phase control signal from the EW IQ.
Figure 3E:
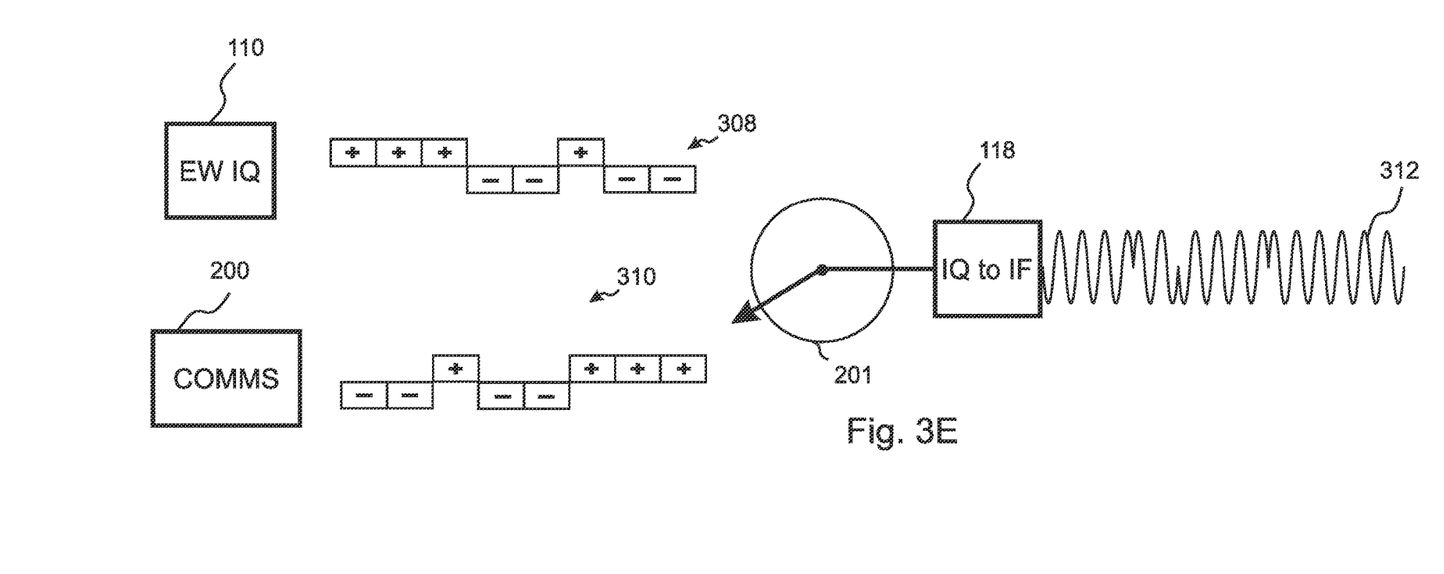
FIG. 3E illustrates the selector selecting a message phase control signal from the COMMS in the embodiment of FIG. 3D.

With reference to FIGS. 3D and 3E, if pseudorandom phase noise modulation is being used to broaden the jamming bandwidth whenever a message is not being transmitted, an IQ stream 308 is also output by the EW IQ 110 to the selector 201. In some of these embodiments, the chip rate of the pseudorandom phase noise modulated IQ 308 is set according to the desired bandwidth of the radar jamming, and the chip rate of the message IQ stream 310 is adjusted to be equal to the chip rate of the EW IQ 110. In addition, the COMMS 200 is configured to implement the same phase encoding method as the EW IQ 110. In FIGS. 3D and 3E, both IQ streams implement BPSK phase encoding. The messages 312 are thereby interleaved between bursts of pseudorandom noise modulated RF 304, and are highly obfuscated, in that it can be nearly impossible to recognize that messages are being interleaved with pseudorandom noise modulations unless the encoding patterns of the message headers are known.

Figure 4:
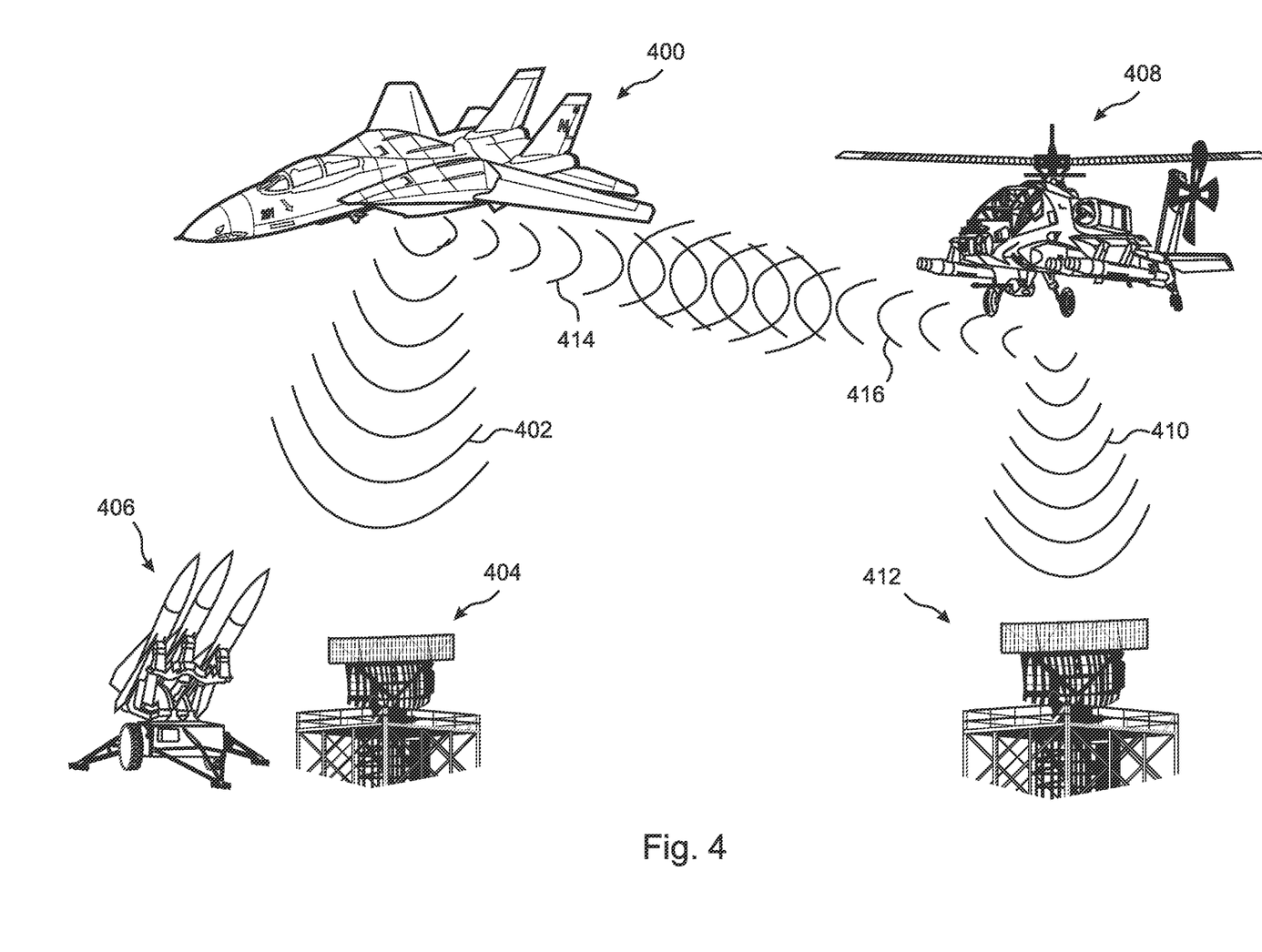
FIG. 4 illustrates transmission of radar jamming signals by EW/COMM units of two aircraft, combined with simultaneous exchange of messages in an embodiment of the present disclosure.

In the example of FIG. 4, the EW/COMM system of a first aircraft 400 is using a primary, directional antenna to transmit a jamming signal 402 toward a first radar 404 that controls the launching of anti-aircraft missiles 406. At the same time, the EW/COMM system of a second aircraft 408 is using a primary, directional antenna to transmit a jamming signal 410 toward a second radar 412. In the illustrated example, each of the aircraft 400, 408 includes a secondary antenna, which can be an omni-directional antenna, that is less directional than the primary antenna 108, thereby ensuring that portions 414, 416 of the jamming signals 402, 410 are transmitted toward and detected by other aircraft in the vicinity.

The COMMS modules 200 of each of the aircraft 400, 408 continuously monitor the jamming signals 414, 416 of other nearby aircraft. When a pre-established message header is detected as a sequence of phase encoded pulses in a jamming signal 414, 416, subsequent phase encoded pulses are stored, de-encrypted, and forwarded as received messages. And when either of the aircraft 400, 408 wishes to transmit a message to one or more other nodes, the message is encoded by the COMMS module 200 as a header followed by a string of message symbols, all of which are imposed as phase modulations by the phase modulator 201 onto the jamming signal 414, 416.

Because identical signals are being transmitted, the use of both highly directional antennae 402, 410 and less directional or even omni-directional antennae 414, 416 is substantially undetectable by the hostile radar or other hostile entities.

Figure 5:
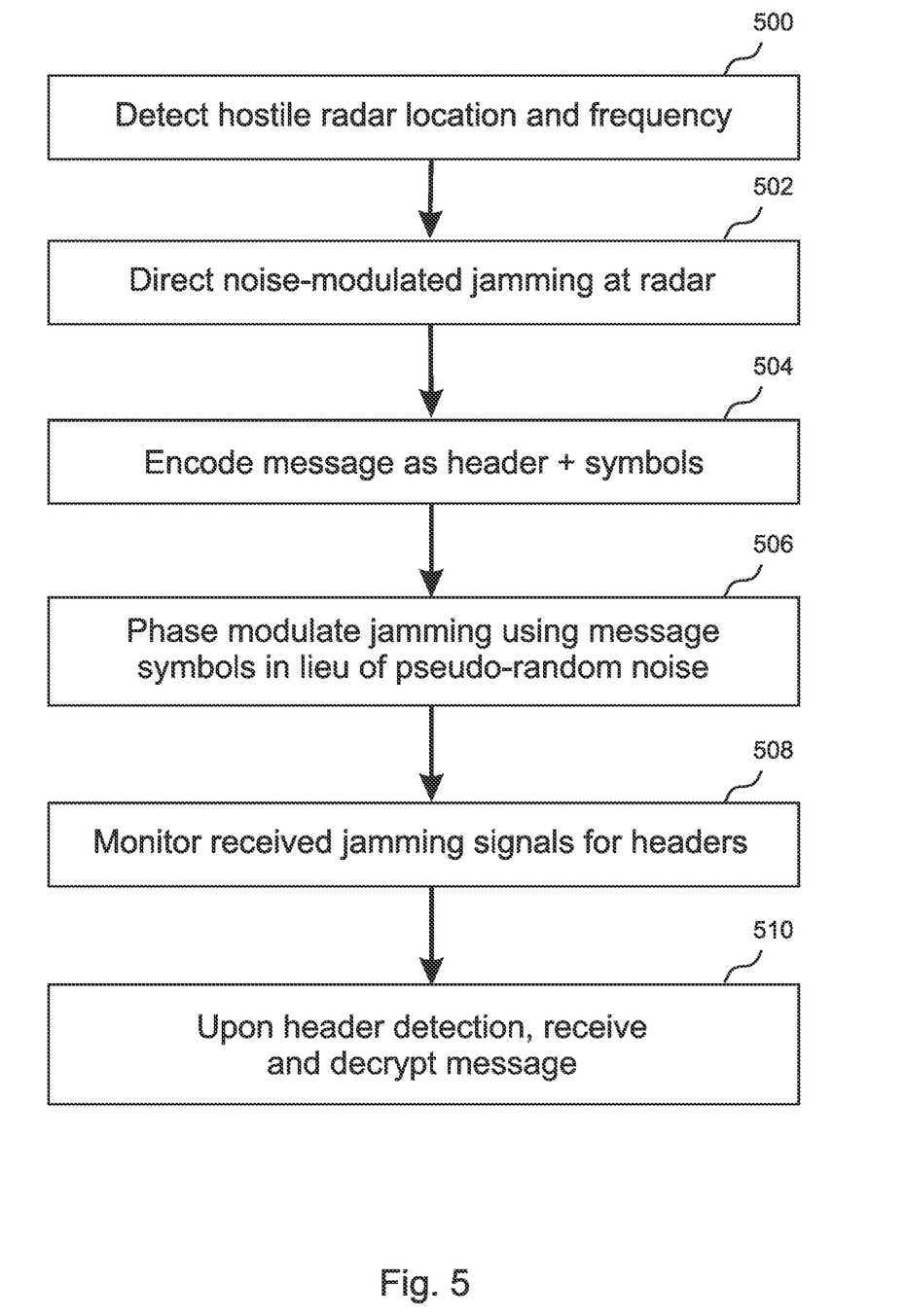
FIG. 5 is a flow diagram that illustrates a method of the present disclosure.

With reference to FIG. 5, an embodiment the method of the present disclosure includes detecting by the EW control module 110 a hostile radar location and operating frequency 500, and directing either a CW or a phase noise modulated jamming signal at the radar 502. When transmission of a message is desired, the message is encoded by the COMMS module 200 as a header followed by a series of symbols 504, for example as BPSK or QPSK IQ phase control pulse streams. In embodiments, the message is encrypted by the COMMS module 200 before being converted into the symbols. The IQ phase control pulses that encode the message symbols are then used to phase modulate the jamming signal 506, in lieu of either continuous wave jamming or pseudorandom phase noise modulated jamming. In the latter case, the phase modulations that encode the messages, as detected by the hostile radar, are indistinguishable from pseudorandom phase noise modulated jamming, and likely go unnoticed.

In the meantime, the COMMS module 200 monitors the phase modulations of jamming signals received from other, nearby vehicles 508. Upon detecting a sequence of phase modulations that matches a pre-established message header, the COMMS module 200 records the associated message, decrypts it if necessary, and forwards it as a received message 510.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications. The disclosure presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A hybrid radar jamming system and message communication system, the system being operable as a node in a communication network, the system comprising:
   an RF receiving system configured to receive RF energy transmitted from a hostile radar;
   an Electronic Warfare (EW) control module configured to determine an operating frequency of the hostile radar according to the received RF energy, and to output a responsive jamming phase control signal;
   a communications module configured to encode a first message as a series of symbols representative of a series of message RF phase shifts, and to output the series of message RF phase shifts at a communication chip rate as a message phase control signal;
   a selector configured to select, as a carrier wave phase control signal, either the jamming phase control signal or the message phase control signal;
   a carrier wave modulator configured to impose phase modulations onto a jamming RF carrier wave according to the carrier wave phase control signal; and
   an RF transmitting system configured to transmit RF energy according to the jamming RF carrier wave that is operable as a hostile radar jamming signal, the transmitted RF energy being further operable as a message communication signal having the first message encoded therein when the selector selects the message phase control signal, said message communication signal being detectable by at least one other node in the communication network;
   the communications module being further configured to detect and extract a second message encoded in a jamming RF carrier wave transmitted by another node within the communication network.

2. The system of claim 1, wherein the first message includes a header that is recognizable to other nodes in the network, the header being selected from among a group containing at least one pre-established header, and wherein detecting the second message includes recognizing that the second message is preceded by one of the pre-established headers.

3. The system of claim 1, wherein the EW control module is able to output a series of pseudorandom jamming RF phase shifts at a jamming chip rate as the jamming phase control signal.

4. The system of claim 3, wherein when the jamming phase control signal is a series of pseudorandom jamming RF phase shifts, the communication chip rate is equal to the jamming chip rate.

5. The system of claim 1, wherein the communications module is further able to encrypt the first message before it is encoded as a series of symbols, and to decrypt the second message.

6. The system of claim 1, wherein the system comprises a plurality of antennae.

7. The system of claim 6, wherein the plurality of antennae are optimized for directing the transmitted RF energy toward the hostile radar, while also ensuring that other nodes in the communication network are able to detect the transmitted RF energy.

8. The system of claim 6, wherein at least one of the antennae is a directional antenna.

9. The system of claim 6, wherein at least one of the antennae is a flat panel element array.

10. The system of claim 1, wherein the communications module is configured to generate and to receive at least one of binary phase shift encoded and quadrature phase shift encoded communication signals.

11. A computer program product including one or more non-transitory machine-readable mediums having instructions encoded thereon that, when executed by one or more processors, are configured to cause the system of claim 1 to transmit and receive messages while also concurrently jamming a hostile radar by executing the steps of:
   causing the RF receiving system to receive RF energy transmitted from the hostile radar;
   causing the EW control module to determine an operating frequency of the hostile radar according to the received RF energy, and to output a responsive jamming phase control signal;

causing the communications module to encode a first message as a series of symbols representative of a series of message RF phase shifts, and to output the series of message RF phase shifts at a communication chip rate as a message phase control signal;

causing the selector to select, as a carrier wave phase control signal, either the jamming phase control signal or the message phase control signal;

causing the carrier wave modulator to impose phase modulations onto a jamming RF carrier wave according to the carrier wave phase control signal;

causing the RF transmitting system to transmit RF energy according to the jamming RF carrier wave that is operable as a hostile radar jamming signal, the transmitted RF energy being further operable as a message communication signal having the first message encoded therein when the selector selects the message phase control signal, said message communication signal being detectable by at least one other node in the communication network; and causing the communications module to detect and extract a second message encoded in a jamming RF carrier wave transmitted by another node within the communication network.

12. The computer program product of claim 11, wherein the instructions, when executed by the system, are further configured to cause the communication module to include at a beginning of the first message a header that is recognizable to other nodes in the network, the header being selected from among a group of at least one pre-established header, and to cause the communication module when detecting the second message to recognize that the second message is preceded by one of the pre-established headers.

13. The computer program product of claim 11, wherein the instructions, when executed by the system, are further configured to cause the EW control module to output a series of pseudorandom jamming RF phase shifts at a jamming chip rate as the jamming phase control signal.

14. The computer program product of claim 13, wherein the instructions, when executed by the system, are configured, when the jamming phase control signal is a series of pseudorandom jamming RF phase shifts, to cause the communication chip rate to be equal to the jamming chip rate.

15. The computer program product of claim 11, wherein the instructions, when executed by the system, are further configured to cause the communications module to encrypt the first message before it is encoded as a series of symbols, and to decrypt the second message.

16. The computer program product of claim 11, wherein the system comprises a plurality of antennae.

17. The computer program product of claim 16, wherein the plurality of antennae are optimized for directing the transmitted RF energy toward the hostile radar, while also ensuring that other nodes in the communication network are able to detect the transmitted RF energy.

18. The computer program product of claim 16, wherein at least one of the antennae is a directional antenna.

19. The computer program product of claim 16, wherein at least one of the antennae is flat panel element array.

20. The computer program product of claim 11, wherein the instructions, when executed by the system, are configured to cause the communications module to generate and to receive at least one of binary phase shift encoded and quadrature phase shift encoded communication signals.

* * * * *